Nov. 10, 1925.
E. R. SARGENT ET AL
CASKET HANDLE
Filed Aug. 17, 1923
Fig.1.
Fig.2.
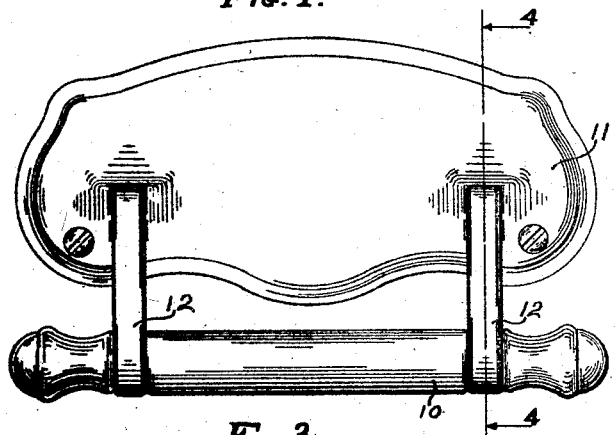
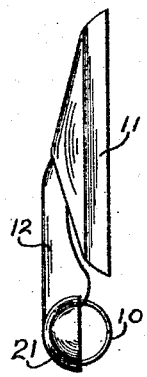
Fig.3.
Fig.4.
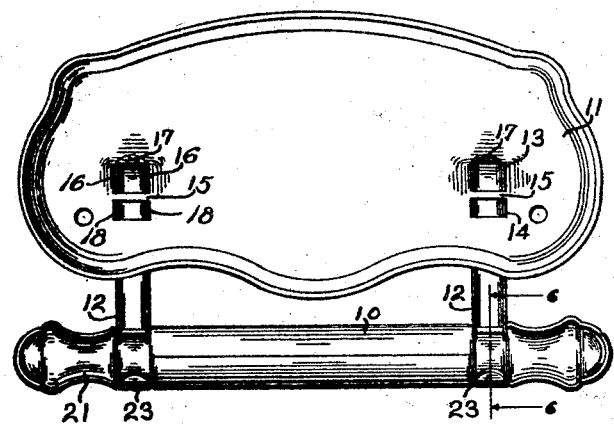
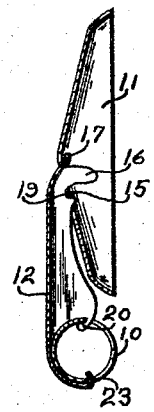
Fig.6.
Fig.5.
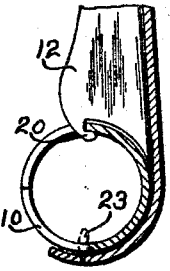
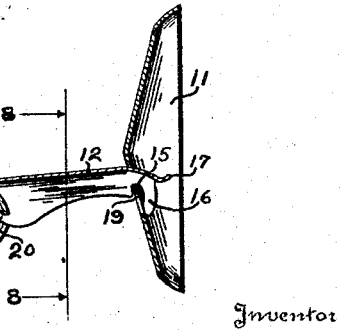

Nov. 10, 1925.
E. R. SARGENT ET AL
1,561,027
CASKET HANDLE
Filed Aug. 17, 1923   2 Sheets-Sheet 2
Fig. 7.
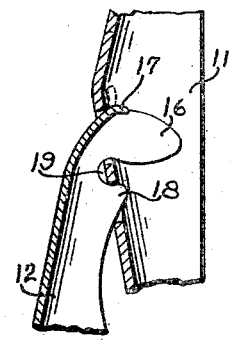
Fig. 8.
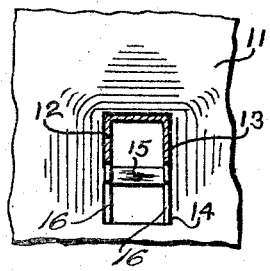
Fig. 9.
Fig. 10.
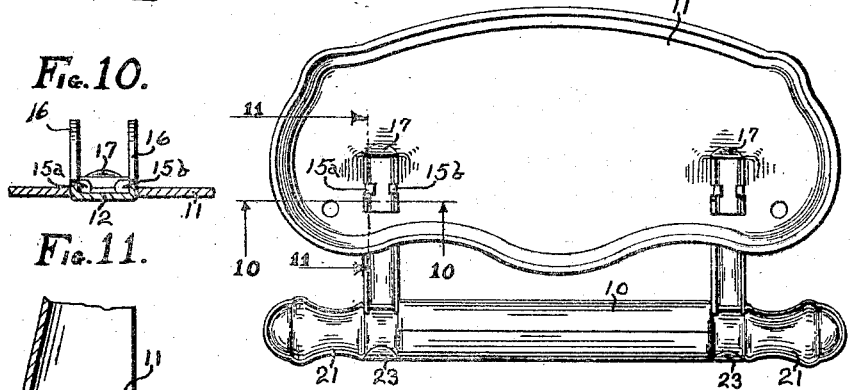
Fig. 11.
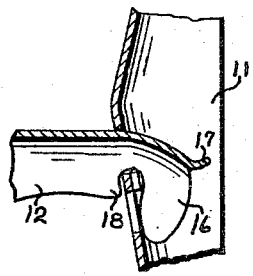
Fig. 13.   Fig. 14.
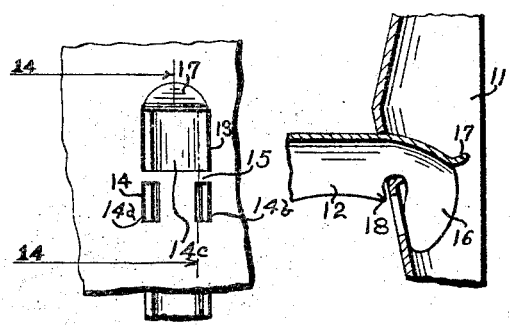
Fig. 12.
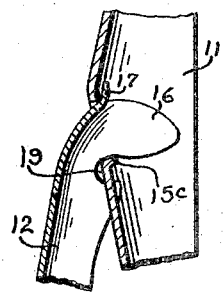
Inventor
Edward R. Sargent
and
Michael J. Kelly
By Henry E. Rockwell
Attorney Patented Nov. 10, 1925.

1,561,027

UNITED STATES PATENT OFFICE.

EDWARD R. SARGENT, OF NEW HAVEN, AND MICHAEL J. KELLY, OF WALLINGFORD, CONNECTICUT, ASSIGNORS TO SARGENT & COMPANY, OF NEW HAVEN, CONNECTICUT.

CASKET HANDLE.

Application filed August 17, 1923. Serial No. 657,954.

*To all whom it may concern:*

Be it known that we, EDWARD R. SARGENT and MICHAEL J. KELLY, citizens of the United States, residing in the city and county of New Haven, State of Connecticut, and city of Wallingford, county of New Haven, State of Connecticut, respectively, have invented certain new and useful Improvements in Casket Handles, of which the following is a full, clear, and exact description.

This invention relates to handles and, more particularly, to that type thereof designed to be used in connection with burial caskets. The invention, moreover, has particular relation to that type of handle wherein the handle bar is connected to a socket or escutcheon plate by a swinging arm and is designed to provide an improved connection between the ends of this arm on the one hand and the socket plate and handle bar on the other.

In the past it has been usual to pivotally secure the arm to the socket plate by means of a pin or pivot rod which is passed through the parts after they are assembled; likewise, the lower end of the arm has usually been connected to the handle bar by means of a securing member passed through the two parts. Such connections require a considerable expenditure of time in the assembling of the parts and therefore materially add to the cost of the resulting product. The parts, moreover, if not properly fitted are apt to be loose to an objectionable degree.

One object of our invention is to overcome the disadvantages pointed out above and to provide a connection between the socket plate and arm which may be readily and easily made by the engagement of the parts themselves and without the use of any additional securing member such as a pin or screw or the like.

Another object of our invention is to provide secure and close fitting connections between the arm and the socket plate and between the arm and handle bar which are so made that very little time is required in assembling the parts, with a consequent reduction in the cost of the finished article.

A still further object of our invention is to provide a new and improved connection between the handle bar and the arm of the casket handle.

To these and other ends the invention consists in the novel features and combinations of parts to be hereinafter described and claimed.

Fig. 1 is a front elevational view of a casket handle embodying my improvements;

Fig. 2 is a side view of the same;

Fig. 3 is a rear elevational view of the casket handle;

Fig. 4 is a sectional view on line 4—4 of Fig. 1;

Fig. 5 is a view similar to Fig. 4, showing the handle bar in raised or operative position;

Fig. 6 is a sectional view on line 6—6 of Fig. 3;

Fig. 7 is an enlarged sectional view illustrating the method of assembling the arm and socket plate;

Fig. 8 is a sectional view on line 8—8 of Fig. 5;

Fig. 9 is a rear elevational view of a casket handle showing a modified form of our invention;

Figs. 10 and 11 are detailed sectional views on lines 10—10 and 11—11 respectively, of Fig. 9;

Fig. 12 is a detailed sectional view showing a further modification of our invention;

Fig. 13 is a rear elevational view of the part shown in Fig. 12; and

Fig. 14 is a sectional view on line 14—14 of Fig. 13 with the handle shown in raised position.

While we have illustrated and described a preferred embodiment of our invention wherein the handle bar 10, as shown in Fig. 1, is suspended from a single socket plate 11 by the swinging arms 12, it will be understood that the invention is applicable as well to a form wherein a separate socket plate is used in connection with each of the arms 12 as shown in Patent No. 1,457,859, granted to E. R. Sargent, June 5, 1923.

The socket plate 11 is provided with an opening 13, through which each of the arm members is inserted, and in the form shown an auxiliary opening 14 is provided below each of the openings 13 and separated therefrom by a narrow strip of metal 15. These openings and the socket plate itself may be provided in any well-known and usual manner, such as by a stamping process. The arms 12 are, in this instance, shown as formed of sheet metal and are so shaped as to present an ornamental appearance as well as to possess the required strength. The body of each of the arms is U-shaped in cross-section and at the upper end the two legs of the U are continued to form a pair of projecting tongues 16, which are designed to enter the openings 13. Between these tongues the base or web portion of the arm is extended to provide a lip 17 which, prior to the assembly of the parts, is left in the plane of the upper edges of the tongues 16. After these tongues have been inserted in the opening 13, the lip 17 is turned upwardly, as shown in dotted lines in Fig. 7, and the arm is pivotally secured against removal from the opening in the socket plate by this means.

Below the tongue 16 the lugs of the U-shaped arms are formed to provide the shoulders 18 so as to leave a recess 19 between each of these shoulders and the corresponding tongue. The recesses 19 are adapted to receive the metal strip 15, which separates the openings 13 and 14 in the plate, and it will be apparent that by this means any looseness or play of the parts is prevented. As shown in Fig. 7, when the handle bar is in its lower or inoperative position, the recess 19 embraces the metal strip 15 snugly, and the shoulders 18 project within the openings 14 in the plate. When the arm is in raised position, as shown in Fig. 5, the shoulders 18 contact with the strip 15 to prevent the arm being wedged inwardly through the openings 13. The tongues 16 are of sufficient length so that they engage the metal of the socket plate below the openings 14 to limit the upper movement of the arms. The connection, as will be observed, is made without the use of any securing member except integral portions of the parts themselves, and, moreover, after the assembly of the arm and plate, the connection is completed by merely turning up the lip 17, which is an extremely simple mechanical operation and one which can be performed expeditiously and cheaply.

At their lower ends, the legs of the U-shaped members are provided with projecting lugs 20, and below these lugs the legs are rounded out to conform to the shape of the handle bar to be secured thereto. As usual in connection with handle bars of this character, each of the tips 21 of the bar shown is cut away for approximately half of its circumference. The web or base of the U-shaped arm is continued to embrace the metal of the tip and is provided at its end with a lip 23 which may be turned upwardly about the metal of the tip of the handle bar to secure it in place. As may be seen from Fig. 5, the lug 20 and lip 23 embrace the edges of the metal of the tip of the bar so that the latter is effectively secured in place both against longitudinal and rotative movements. It will be apparent that the full round portion of the bar is designed to be of the same length as the distance between the arms 12 so that any tendency of the bar to slide longitudinally within the arms 12 will be prevented by contact of this portion of the bar with the lug 20 and the lip 23.

In Figs. 9, 10 and 11, we have shown a modified form of our invention, wherein the partitioning strip 15 is severed at its central portion and turned back to provide a pair of relatively strong ears $15^a$ and $15^b$, which are received within the recesses 19 of the arm. It will be apparent that, as shown in Fig. 11, when the ears $15^a$ and $15^b$ are of two-ply thickness, a closer fit of these members in the recesses 19 will be secured when the arm is in raised position, and hence there will be less tendency for relative movement or play between the parts.

In Figs. 12, 13 and 14, we have shown a further modified form of our invention, wherein the opening 14 is divided into a pair of openings $14^a$ and $14^b$, which are separated by a strip of metal $14^c$, integral with the socket plate and the partitioning strip 15. Such an arrangement adds to the strength of the connection which may be found advisable in connection with handles of larger sizes. The upper edge of the strip 15 is, in this instance, turned inwardly to provide a horizontally extending shoulder $15^c$ which is adapted to provide a broad bearing surface for the tongues 16 of the arms, and to prevent any play between the parts, due to the size of the recess 19, when the arm is in horizontal position, as shown in Fig. 14. It will be apparent that in either the form shown in Figs. 9 to 11 or the form shown in Figs. 12 to 14, we have in effect thickened the metal of the strip 15, about which the arm pivots, in order that there will be a tight connection between the parts at all times. Such a thickening may be found to be especially desirable in connection with handle bars of larger sizes.

While we have shown and described some preferred embodiments of our invention, it will be understood that it is not to be limited to the exact details shown, but is capable of modification and variation within the spirit of the invention and within the scope of the appended claims.

What we claim is:—

1. in a casket handle, an escutcheon plate having an opening, and an arm swingably connected thereto, said arm having side tongues projecting through said opening and adapted to bear upon the lower edge thereof and an upper lip between said tongues adapted to be inserted in said opening and thereafter bent to engage an edge of the opening to prevent the removal of the arm therefrom.

2. In a casket handle, an escutcheon plate provided with an opening, an arm adapted to be swingably connected thereto by having its upper end passed through said opening and thereafter turned upwardly from its normal position to engage the edge of the opening and prevent separation of the parts.

3. In a casket handle, an escutcheon plate provided with an opening, an arm of U-shaped cross-section adapted to be swingably connected thereto, the side portions of said arm being continued to form projecting tongues protruding through said opening and bear upon the lower edge thereof, and the web of the arm being continued to provide a lip adapted to be bent out of its normal position to engage the upper edge of the opening to prevent separation of the parts.

4. In a casket handle, an escutcheon plate provided with adjacent openings and a member extending between said openings, and an arm recessed to receive said member so as to swing therearound, said arm also being provided with projecting portions to enter one of said openings and bear on said member, and an upper lip between said portions adapted to be bent to engage the edge of the opening to prevent separation of the parts.

5. In a casket handle, an escutcheon plate provided with adjacent openings and a member extending between said openings, and an arm provided at its under portion with a side tongue and a shoulder to enter said openings, and a recess between said tongue and shoulder to receive said strip so that the arm may bear thereon, said arm also being provided with a projecting upper lip adapted to enter one of said openings and thereafter to be bent to engage the upper edge of the opening to prevent separation of the parts.

6. In a casket handle, an escutcheon plate provided with adjacent openings and a member extending between said openings, and an arm provided at its under portion with a tongue and a shoulder to enter said openings, and a recess between said tongue and shoulder to receive said member so that the arm may bear thereon, said arm also being provided with a projecting upper lip adapted to enter one of said openings and thereafter to be bent to engage the upper edge of the opening to prevent separation of the parts, and said member extending between said openings being provided with a broad bearing surface for said arm.

7. In a casket handle, an arm and a handle bar connected to the arm, said arm being provided with vertically spaced projecting members adapted to embrace opposite upper and lower edges of a portion of the bar to hold the parts together.

8. In a casket handle, an escutcheon plate, an arm swingably connected thereto, and a handle bar connected to said arm, the arm being provided with a downwardly facing recess, the edge of a portion of the bar being engaged in said recess, and a terminal lip provided upon the arm and adapted to be bent about a portion of the bar to cooperate with said recess to secure the parts together.

9. In a casket handle, an arm of U-shaped cross-section, the sides thereof being provided with downwardly extending projections, a bar of closed conformation for a part of its length and having a part cut-away for the remainder of its length, one edge of said cut-away portion being adapted to be lodged against said projections and said arm having a projecting tongue adapted to be bent around the opposite edge of the open portion of the bar to secure the parts together.

10. In a casket handle, an escutcheon plate, a handle bar and an arm secured to the handle bar, said escutcheon plate being provided with an opening and said arm being U-shaped in cross section, the legs of the U being extended adjacent the upper end of the arm to provide projecting tongues extending into the opening of the plate, and the web of the arm being extended at its upper end to provide a lip adapted to be inserted through the opening in the plate and thereafter turned upwardly to engage the edge of the opening to secure the arm to the plate.

11. In a casket handle, an escutcheon plate having an opening and an arm swingably connected thereto, said arm having side tongues projecting through said opening and adapted to bear upon the lower edge thereof, and an upper lip projecting through the opening adjacent the upper edge thereof, said lip being bent out of its normal plane to engage the edge of the opening to connect the arm to the plate.

12. A casket handle comprising an escutcheon plate provided with adjacent openings, a member extending between said openings, and an arm provided at its upper portion with a slot to receive said member, and projections above and below said slot to enter the openings in the plate, the projections above said slot being of sufficient length to contact with the metal of the plate below said openings when the arm is in raised position, and means between said upper projections for securing said arm against removal from said escutcheon plate.

13. In a casket handle, an escutcheon plate provided with adjacent openings and a member extending between said openings, an arm provided at its upper portion with a tongue and a shoulder to enter said opening, and a recess between said tongue and shoulder to receive said member so that the arm may bear thereon, and means whereby said member is thickened to avoid relative movement between the parts.

In witness whereof, we have hereunto set our hands this 14th day of August, 1923.

EDWARD R. SARGENT.
MICHAEL J. KELLY.